US010303202B1

(12) United States Patent
Adya et al.

(10) Patent No.: US 10,303,202 B1
(45) Date of Patent: May 28, 2019

(54) METHOD AND APPARATUS FOR PERFORMING CLOCK ALLOCATION FOR A SYSTEM IMPLEMENTED ON A PROGRAMMABLE DEVICE

(71) Applicant: Altera Corporation, San Jose, CA (US)

(72) Inventors: Saurabh Adya, San Jose, CA (US); Mahesh A. Iyer, Fremont, CA (US); Love Singhal, San Jose, CA (US)

(73) Assignee: Altera Corporation, San Jose, CA (US)

( * ) Notice: Subject to any disclaimer, the term of this patent is extended or adjusted under 35 U.S.C. 154(b) by 254 days.

(21) Appl. No.: 15/236,620

(22) Filed: Aug. 15, 2016

(51) Int. Cl.
G06F 17/50 (2006.01)
G06F 1/10 (2006.01)
G06F 1/08 (2006.01)

(52) U.S. Cl.
CPC . *G06F 1/10* (2013.01); *G06F 1/08* (2013.01)

(58) Field of Classification Search
CPC .............. G06F 17/505; G06F 17/5045; G06F 2217/84; G06F 2217/72
USPC ........................................................ 716/138
See application file for complete search history.

(56) References Cited

U.S. PATENT DOCUMENTS

| 5,822,217 A * | 10/1998 | Shenoy ............... G06F 17/5045 716/108 |
| 8,001,537 B1 * | 8/2011 | Iotov et al. ......... G06F 17/5054 716/103 |
| 8,108,812 B1 * | 1/2012 | van Antwerpen et al. ................. G06F 17/5054 716/104 |
| 8,832,608 B1 * | 9/2014 | Chakrabarty et al. ...................... G06F 17/505 716/51 |
| 9,280,628 B2 * | 3/2016 | Walker et al. ........ G06F 17/505 |
| 9,922,157 B1 * | 3/2018 | Ebeling et al. ..... G06F 17/5077 |

OTHER PUBLICATIONS

Mneimneh, et al.; "REVERSE: Efficient Sequential Verification for Retiming"; Twelfth International Workshop on Logic and Synthesis, Laguna Beach, California, May 28-30, 2003.
Leiserson, et al.; "Retiming Synchronous Circuitry", Algorithmica (1991) 6: 5-35.

* cited by examiner

*Primary Examiner* — Sun J Lin
(74) *Attorney, Agent, or Firm* — Compass IP Law PC

(57) ABSTRACT

A method for designing a system on a target device includes placing the system on the target device. A netlist retiming is performed on the placed system. A clock allocation and a clock region optimization are performed utilizing information from the placing and the netlist retiming.

22 Claims, 18 Drawing Sheets

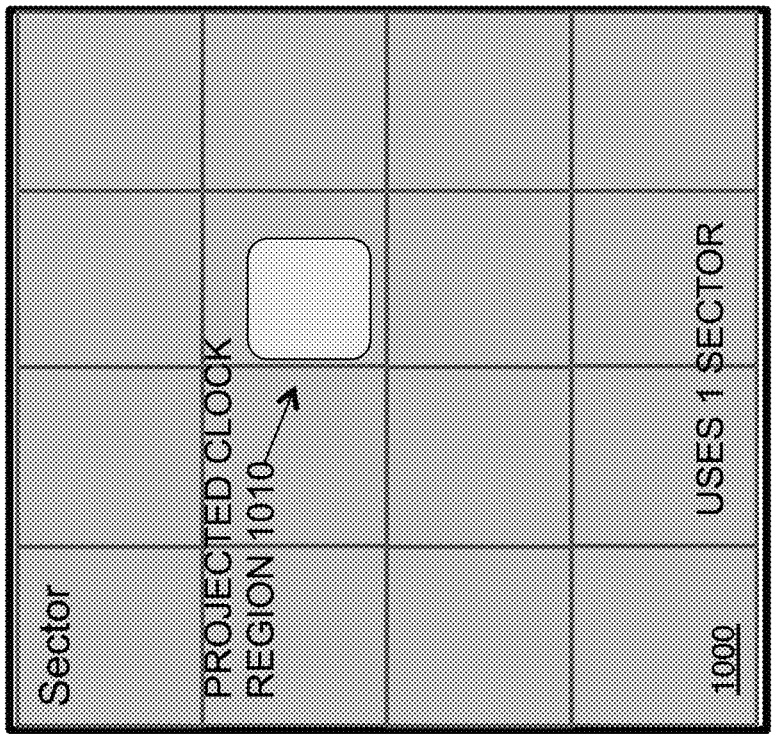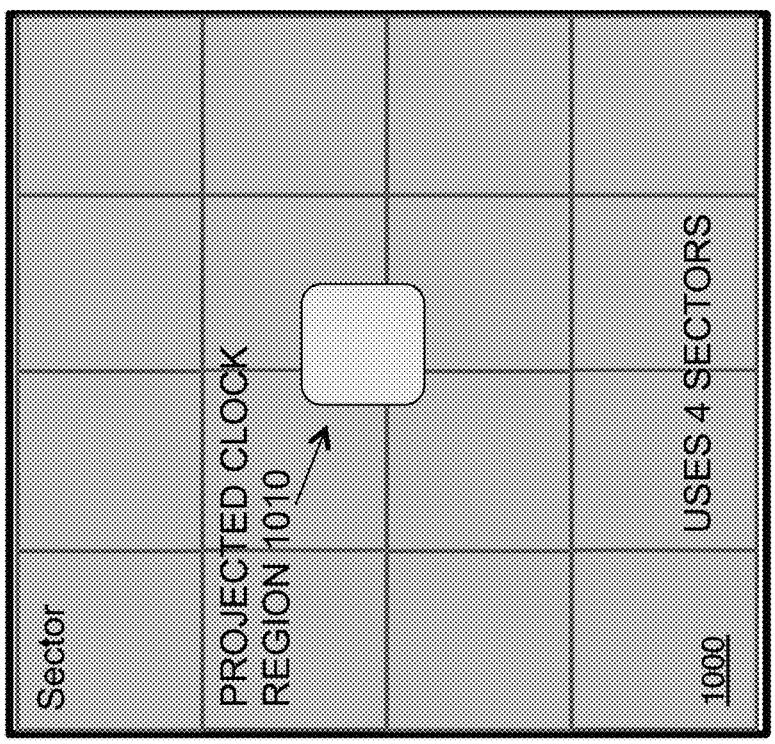
FIG. 10

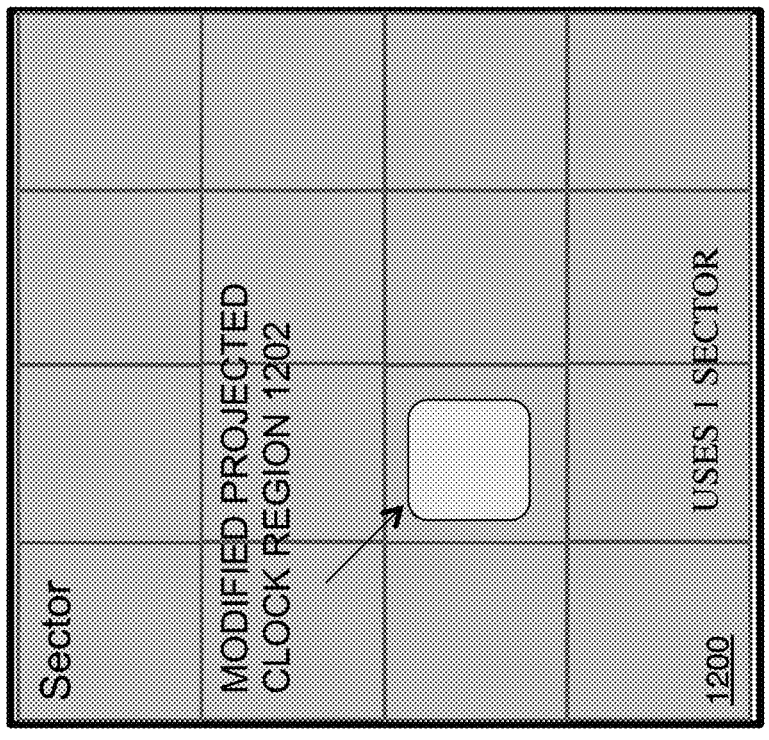
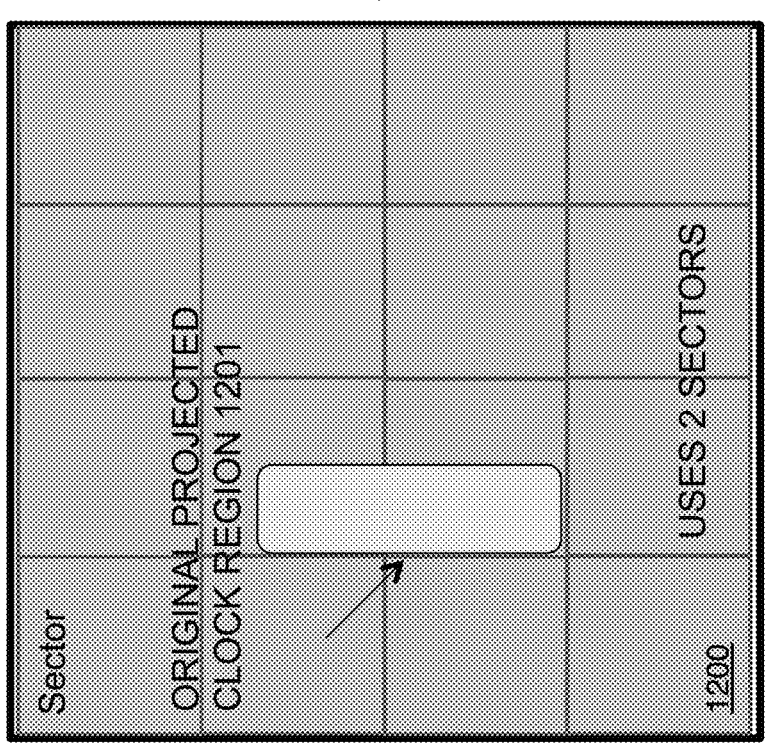
FIG. 12

METHOD AND APPARATUS FOR PERFORMING CLOCK ALLOCATION FOR A SYSTEM IMPLEMENTED ON A PROGRAMMABLE DEVICE

FIELD

Embodiments of the present disclosure relate to tools for designing systems on target devices. More specifically, embodiments of the present disclosure relate to a method and apparatus for performing clock allocation for a system implemented on a programmable device.

BACKGROUND

Target devices such as field programmable gate arrays (FPGAs), structured application specific integrated circuits (ASICs), and ASICs are used to implement large systems that may include million of gates and megabits of embedded memory. The complexity of a large system often requires the use of electronic design automation (EDA) tools to create and optimize a design for the system onto physical target devices. Among the procedures performed by EDA tools in a computer aided design (CAD) compilation flow is hardware description language (HDL) compilation. HDL compilation involves performing synthesis, clock allocation, placement, routing, and timing analysis of the system on the target device.

Register retiming is a circuit optimization technique that may be utilized during HDL compilation to improve the performance of sequential circuits. Register retiming repositions registers (flip-flops) in the circuit without changing the combinational logic of the circuit.

SUMMARY

According to an embodiment of the present disclosure, a method and apparatus is disclosed for performing clock allocation ("clock planning") during compilation of a system implemented on a target device such as a programmable device. Embodiments of the present disclosure enable a size and location of various clock networks ("clock domains" or "clocks") in the system to be defined during compilation. The definition of the size and location may extend beyond the granularity of occupying a quadrant, half-chip, and entire chip, and is not restricted to a predefined size or area on the target device. Embodiments of the present disclosure reduce the amount of resources required to implement the clock networks by allowing clock allocation to be aware of placement of the system. The resources may include clock resources. An initial global placement of the system may be performed prior to clock allocation and the placement results generated may be used for clock allocation. According to an embodiment of the disclosure, clock regions are defined based on the physical placement of sequential elements of respective clock networks. The sequential elements may include flip-flops, digital signal processors (DSPs), random access memories (RAMs), and other elements that are clocked. To increase utilization of resources on a programmable device, clock allocation attempts to minimize the number of resources allocated to a clock network without adversely affecting performance of the system.

According to an embodiment of the present disclosure, a netlist retiming procedure is performed after an initial global placement of the system and prior to clock allocation. This allows clock allocation to be performed in response to optimizations achieved during netlist retiming and prevents clock allocation from imposing restrictive constraints that could potentially prohibit effective retiming at later stages of compilation. Embodiments of the present disclosure facilitate high performance of the system from post routing retiming operations with minimal constraints from clock allocation. Embodiments of the present disclosure also allow for systems having a large number of clock networks to fit legally on the target device, and allow for maximum utilization of clock resources on the target device. Furthermore, embodiments of the present disclosure minimize clock insertion delay for clock networks in the system. Minimizing clock insertion delay may lead to lower negative clock skew and improve frequency of operation due to on chip variation (OCV).

According to an embodiment of the present disclosure, a method for designing a system on a target device includes placing the system on the target device. Netlist retiming is performed on the placed system. Clock planning is performed utilizing information from the placement and the retiming. According to an aspect of the present disclosure, performing clock planning includes identifying a size and location on the target device for a clock region occupied by a clock network. According to an embodiment of the present disclosure, a method for designing a system on a target device includes performing synthesis where a clock network is defined. Placement is performed in response to a clock region projected for the clock network. According to an aspect of the present disclosure, performing placement in response to the clock region projected for the clock network includes reducing a size of the clock region projected for the clock network, and/or reducing a number of sectors occupied by the clock region projected for the clock network by changing a location and/or shape of the clock region projected for the clock network. A sector may be a gridding of a target device chip to describe a minimum area where a clock resource can be used.

According to an embodiment of the present disclosure, a size of a clock region and a number of sectors overlapped by the clock region are optimized during placement of a system. The optimization may take into account wire usage, routing congestion, density constraints, and target device legality requirements. Clock networks may also be incrementally refined at various stages in a design implementation flow, as the design undergoes further optimizations

BRIEF DESCRIPTION OF THE DRAWINGS

The features and advantages of embodiments of the present disclosure are illustrated by way of example and are not intended to limit the scope of the embodiments of the present disclosure to the particular embodiments shown.

FIG. 10 illustrates an example of reducing a number of sectors crossed by a clock region projected for a clock network by moving the clock region projected for the clock network according to an exemplary embodiment of the present disclosure.

FIG. 12 illustrates an example of reducing a number of sectors crossed by a clock region projected for a clock network by re-shaping the clock region projected for the clock network according to an exemplary embodiment of the present disclosure.

DETAILED DESCRIPTION

In the following description, for purposes of explanation, specific nomenclature is set forth to provide a thorough understanding of embodiments of the present disclosure. It will be apparent to one skilled in the art that specific details in the description may not be required to practice the embodiments of the present disclosure. In other instances, well-known circuits, devices, procedures, and programs are shown in block diagram form to avoid obscuring embodiments of the present disclosure unnecessarily.

Figure 1:
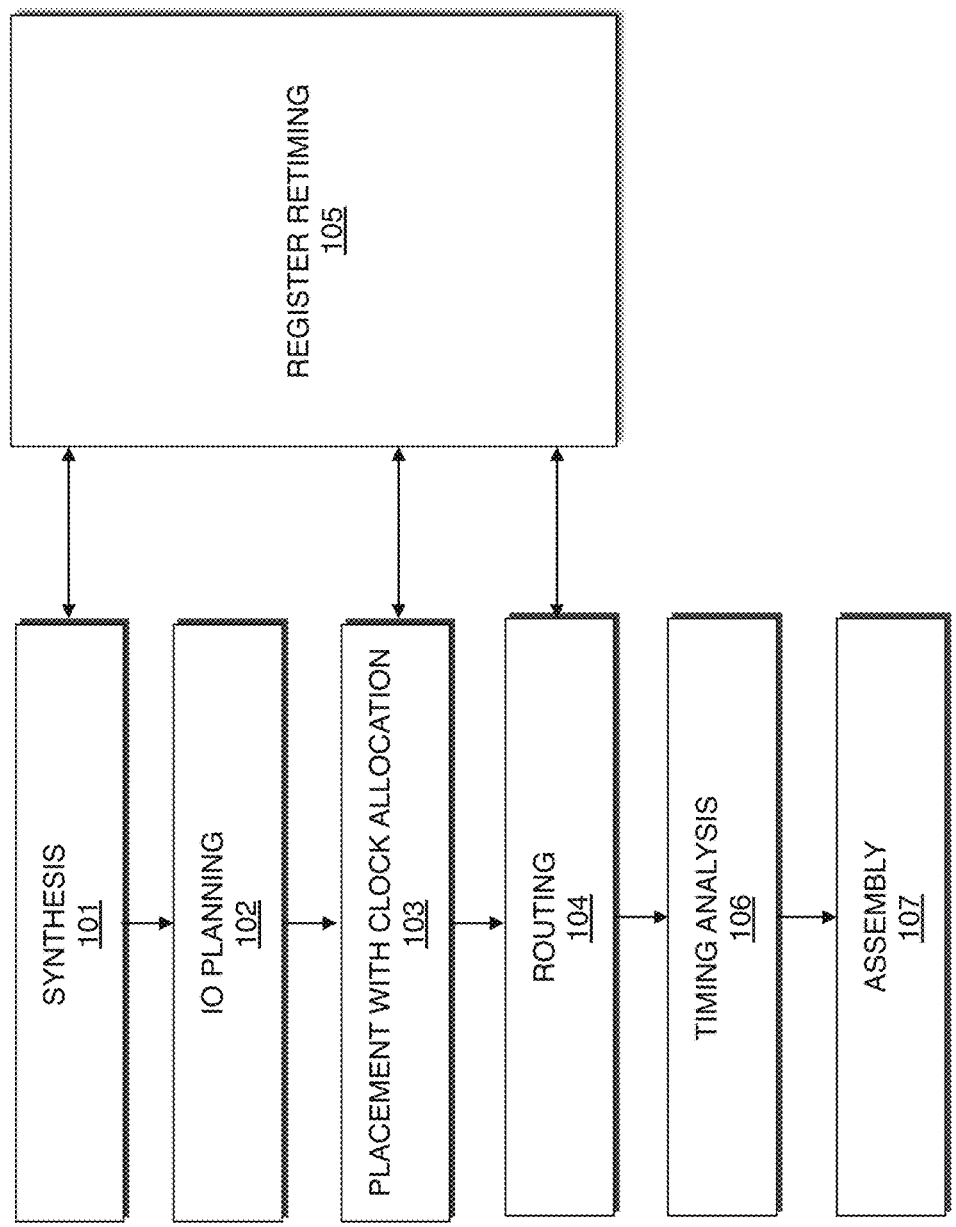
FIG. 1 is a flow chart illustrating a method for designing a system on a target device according to an exemplary embodiment of the present disclosure.

FIG. 1 is a flow chart illustrating a method for designing a system on a target device according to an exemplary embodiment of the present disclosure. The target device may be a field programmable gate array (FPGA), application specific integrated circuit (ASIC), a structured ASIC, or other device. According to one embodiment, the procedure illustrated in FIG. 1 may be performed by a computer aided design (CAD)/electronic design automation (EDA) tool implemented on a computer system.

At 101, a design for the system is synthesized. The specification for the system may be provided though a design entry tool. The specification may describe components and interconnections in the system. According to an embodiment of the present disclosure, the design entered may be in register transfer level (RTL) in a hardware description language (HDL). Synthesis includes generating a logic design of the system to be implemented by the target device. According to an embodiment of the present disclosure, synthesis generates an optimized logical representation of the system from an HDL design definition. The optimized logical representation of the system may include a representation that has a minimized number of functional blocks such as logic gates, logic elements, and registers required for the system. Synthesis also includes mapping the optimized logical representation. Mapping includes determining how to implement logic gates and logic elements in the optimized logic representation with the types or categories of resources available on the target device. The resources available on the target device may be referred to as "cells" or "components" and may include logic-array blocks, registers, memories, digital signal processing blocks, input output elements, look up tables, and other components. According to an embodiment of the present disclosure, a netlist is generated from mapping. This netlist may be an optimized technology-mapped netlist generated from the HDL. It should be appreciated that the netlist generated from synthesis identifies one or more clock networks for the system. The identified clock networks may include a plurality of input output pins, phase-locked loops (PLLs), logic, registers (flip-flops), and other circuitry or components.

At 102, input output (IO) planning is performed. According to an embodiment of the present disclosure, IO planning involves assigning IO pins on the target device to IO pins defined in the netlist.

At 103, the system is placed. According to an embodiment of the present disclosure, placement involves placing the technology-mapped logical system design on the target device. Placement includes fitting the system on the target device by determining which specific resources on the target device are to be assigned to and implemented by the technology-mapped netlist determined during synthesis. Placement may include clustering which involves grouping logic elements together to form the logic clusters present on the target device.

According to an embodiment of the present disclosure, clock allocation is performed during placement procedure 103. In this embodiment, clock allocation is performed in response to placement results generated during an initial global placement. According to an embodiment of the present disclosure, physical synthesis optimizations, such as register retiming, may be performed after the initial global placement. In this embodiment, clock allocation may be performed in response to both the placement results and physical synthesis optimization results.

At 104, the placed design is routed. During routing, routing resources on the target device are allocated to provide interconnections between logic gates, logic elements, and other components on the target device. Routability optimization may also be performed on the placed logic design. According to an embodiment of the present disclosure, the goal of routability optimization is to reduce the amount of wiring used to connect components in the placed logic design, while maintaining other metrics like timing to the best extent possible. Routability optimization may include performing fanout splitting, logic duplication, logical rewiring, or other procedures. It should be appreciated that one or more of the procedures may be performed on the placed logic design.

At 105, register retiming is performed on the system. According to an embodiment of the present disclosure, register retiming improves the performance of a sequential circuit by repositioning registers without changing the combinational elements between registers and/or input outputs that have the worst delay. Reducing the delay on combinational paths is a goal of register retiming. It should be appreciated that register retiming 105 may be performed during and/or after synthesis 101, placement with clock allocation 103, and/or routing 104.

At 106, timing analysis is performed on the retimed design of the system generated. According to an embodiment of the present disclosure, the timing analysis determines whether timing constraints of the system are satisfied and generates signoff-quality timing reports for the user.

At 107, assembly is performed. The assembly procedure involves creating a data file that includes information determined by the procedures described at 101-106. The data file may be a bit stream that may be used to program a target device. By programming the target with the data file, components on the target device are physically transformed to implement the system.

Figure 2A:
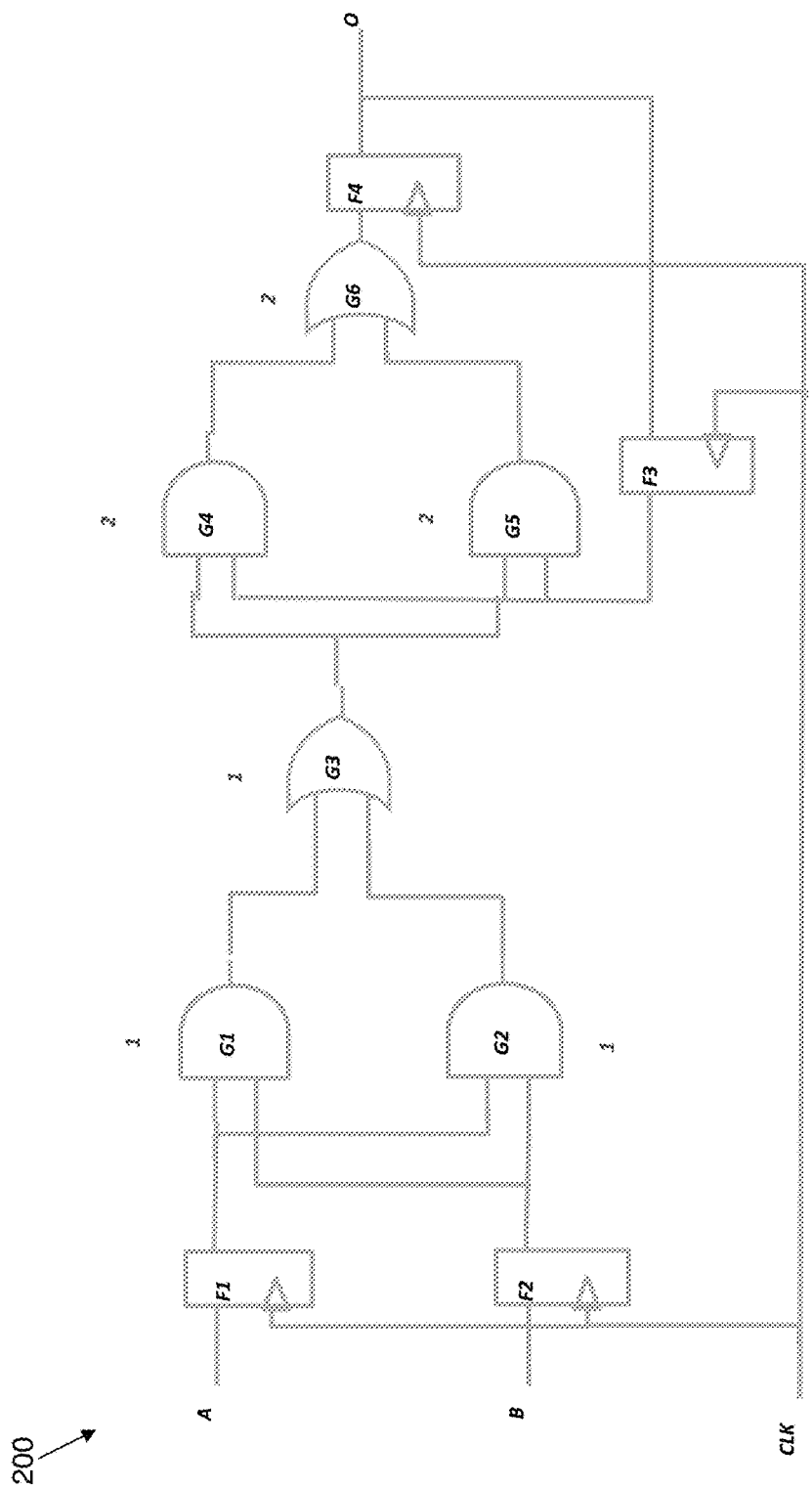
FIGS. 2A-2C illustrate an example of register retiming according to an exemplary embodiment of the present disclosure.
Figure 2B:
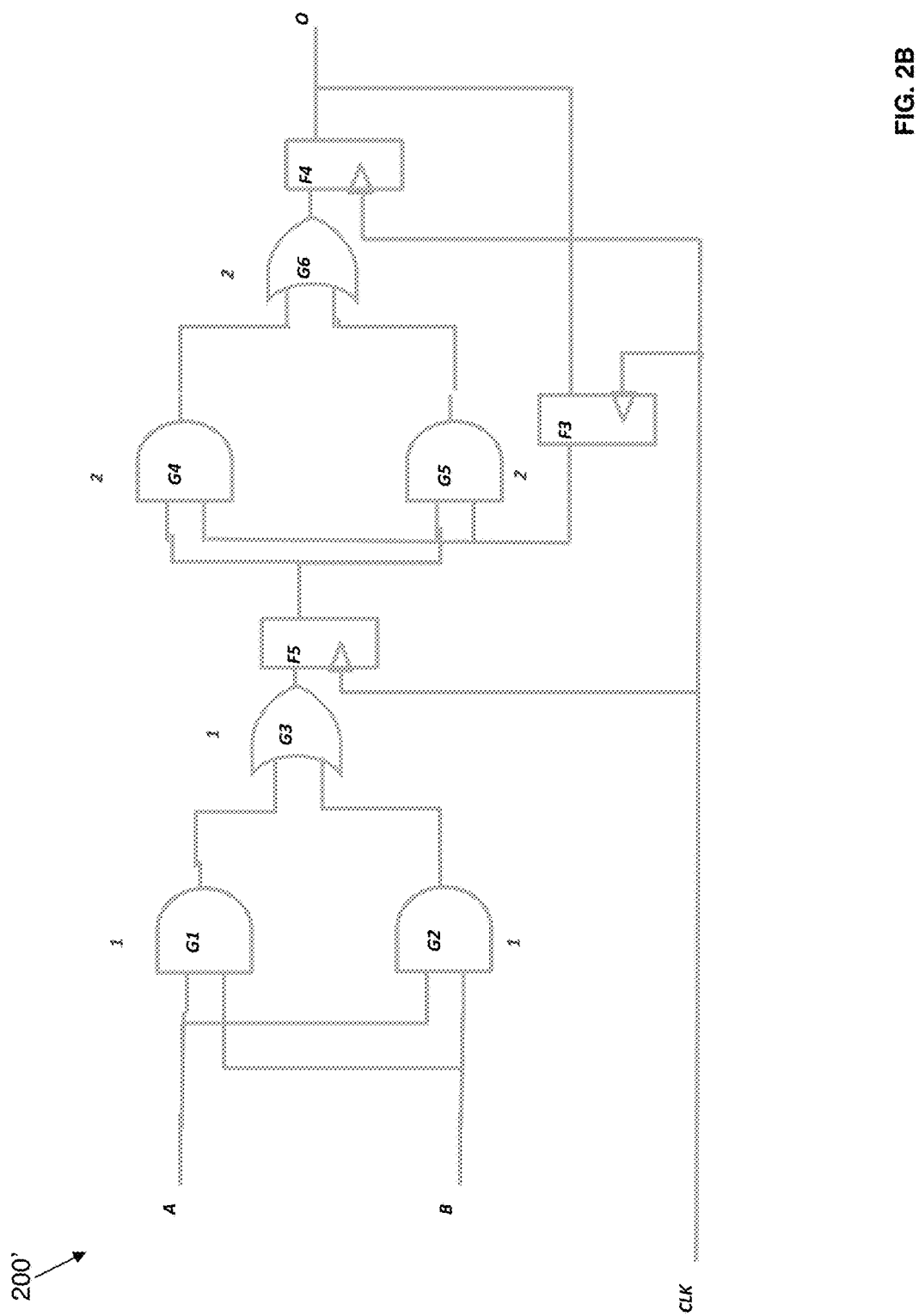
Figure 2C:
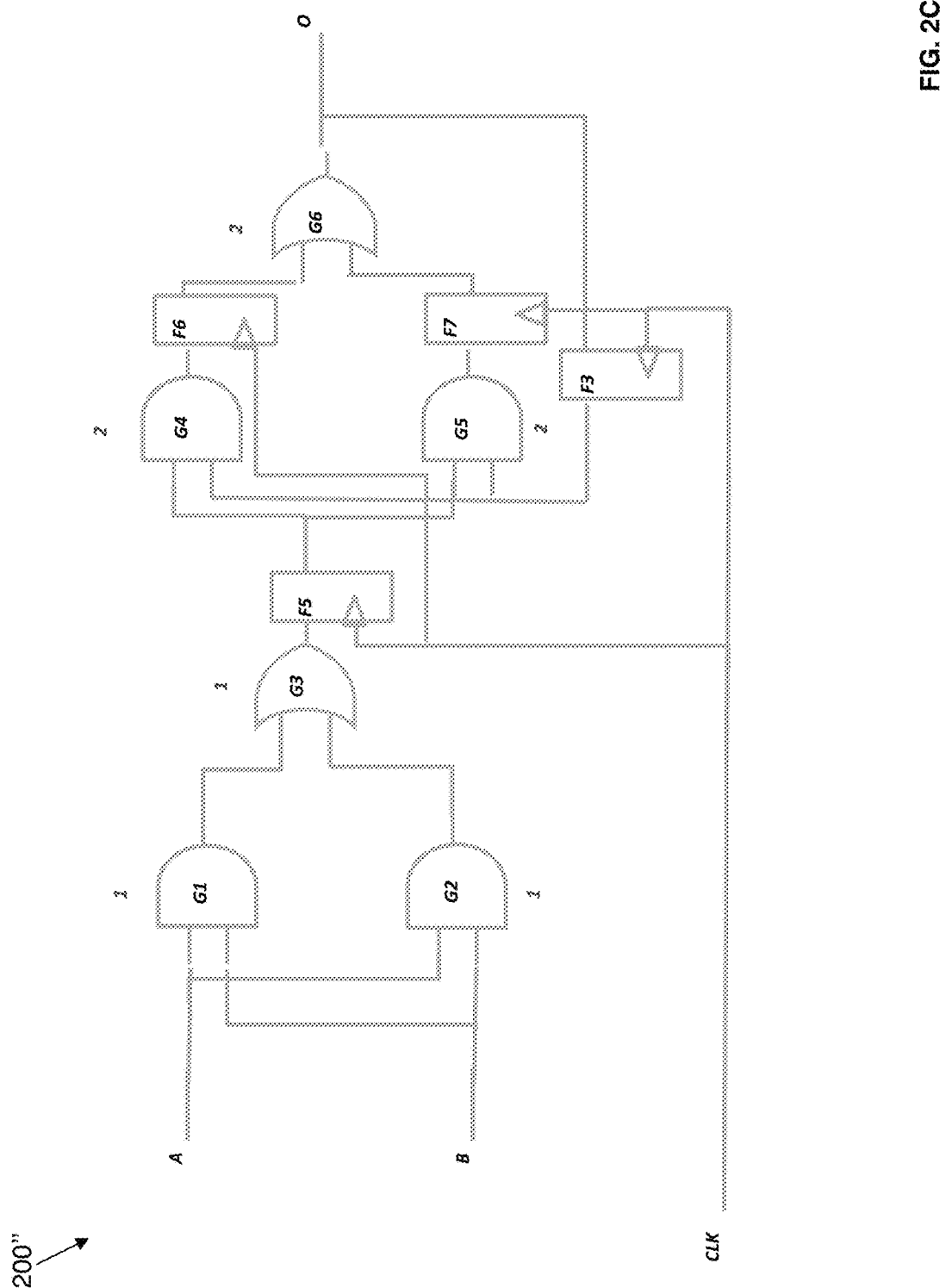

FIGS. 2A-2C illustrate an example of register retiming according to an embodiment of the present disclosure.

FIG. 2A illustrates an exemplary sequential circuit 200 according to an embodiment of the present disclosure. This sequential circuit 200 has six combinational gates, G1, G2, G3, G4, G5, and G6 with delays of 1, 1, 1, 2, 2, 2 respectively, as shown. The sequential circuit 200 also has four flip-flops, F1, F2, F3, F4 that are all positive edge-triggered flip-flops clocked by the same clock CLK. The sequential circuit 200 has 3 primary inputs A, B, and CLK, one primary output, O, and fanouts reconverging on gates G3 and G6. The maximum combinational delay through this circuit is 6. One such path is F1→G1→G3→G4→G6→F4. The clock period for this circuit is dictated by this longest path delay of 6.

FIG. 2B illustrates a retimed sequential circuit 200'. The retimed sequential circuit 200' has flip-flops F1 and F2 forward retimed through gates G1, G2, and G3. Retimed sequential circuit 200' has only 3 flip-flops and the maximum combinational delay is 4. This circuit has three flip-flops and it is the minimum number of flip-flops that is achievable for this circuit.

FIG. 2C illustrates a further retimed sequential circuit 200". The sequential circuit 200' from FIG. 2B has its clock period reduced by backward retiming flip-flop F4 across gate G6. This backward-retimed circuit is shown in FIG. 2C. Sequential circuit 200" has a maximum combinational delay of 2 for all input-to-flip-flop, flip-flop-to-flip-flop, and flip-flop-to-output paths. Since the worst delay of a single combinational cell in this circuit is 2, this is the minimum delay that can be achieved. Hence the sequential circuit 200" in FIG. 2C represents the min-period retiming solution.

Figure 3:
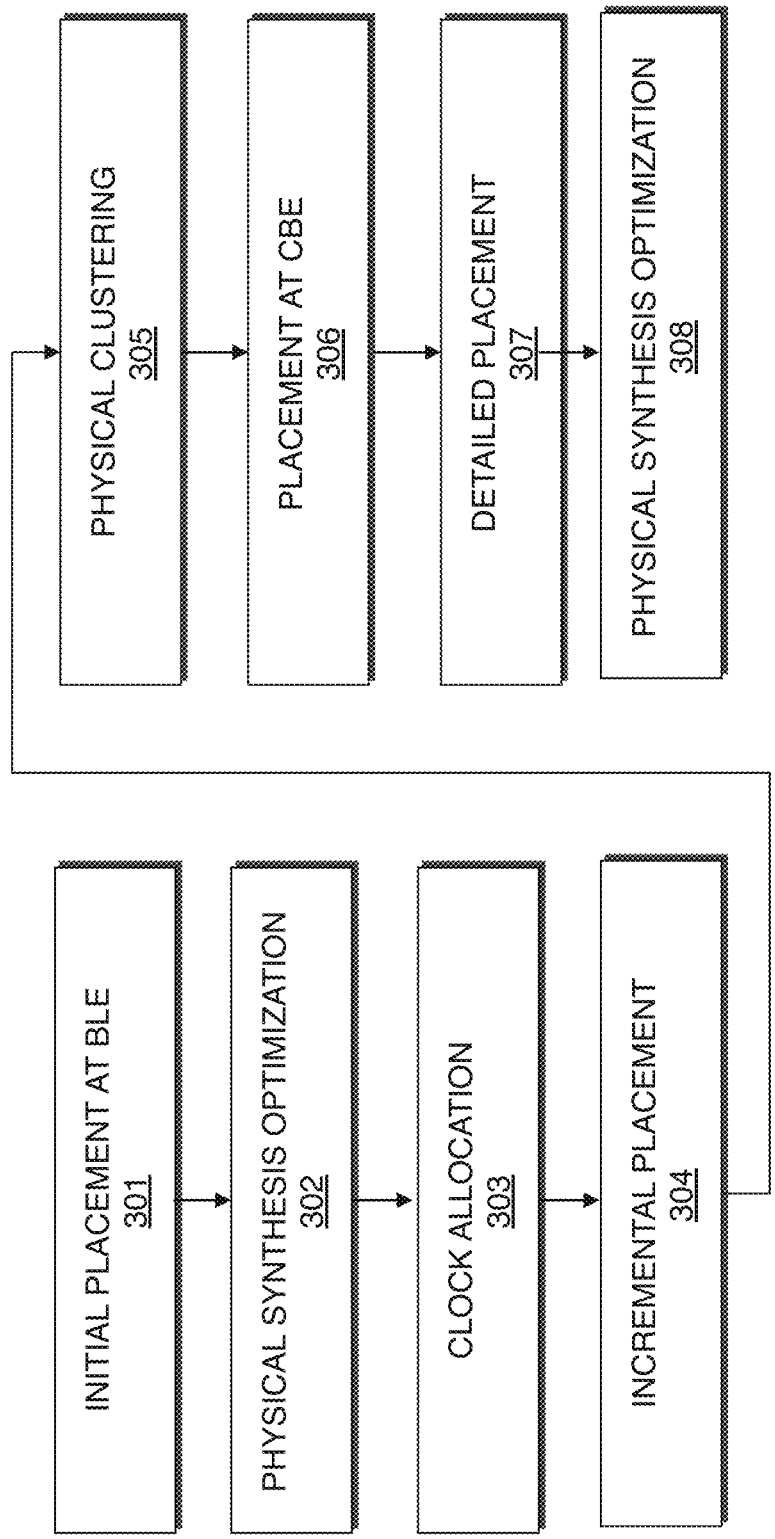
FIG. 3 is a flow chart illustrating a method for performing placement with clock allocation according to an exemplary embodiment of the present disclosure.

FIG. 3 is a flow chart illustrating a method for performing placement with clock allocation according to an exemplary embodiment of the present disclosure. The procedures illustrated in FIG. 3 may be used to implement procedure 103 (shown in FIG. 1). At 301, an initial placement is performed on a system. The initial placement may utilize one or more different types of placement algorithms. According to an embodiment of the present disclosure, analytic placement is used at initial placement. Analytic placement represents a placement problem as systems of equations to which standard numerical solvers are applied. Analytic placement uses solvers that require the placer objective function to be both continuous and differentiable. It should be appreciated that other types of placement algorithms, such as simulated annealing or other algorithm may also be used in addition or in place of analytic placement at initial placement.

According to an embodiment of the present disclosure, clock regions projected for clock networks in the system are identified from information of the clock network generated during synthesis. During initial placement, components in the clock network may be placed with additional optimization objectives of minimizing a size of the projected clock region, and/or minimizing a number of sectors on the target device crossed or occupied by the projected clock region. According to an embodiment of the present disclosure, initial placement places the system composed of basic logic elements (BLEs) on to the target device. These basic logic elements are assigned to be implemented by specific hardware on a target device.

At 302, physical synthesis optimizations are performed on the placed system. Physical synthesis optimizations improve timing closure by reducing a number of critical paths. Physical synthesis optimizations may include logic replication, combinational logic resynthesis, local re-wiring, register retiming ("netlist retiming"), and other procedures. According to an embodiment of the present disclosure, physical synthesis optimization 302 involves calling and performing register retiming procedure 105 shown in FIG. 1. According to an embodiment of the present disclosure, register retiming procedure 105 may be driven by the timing information resulting from the placement of BLEs. For every retimed flip-flop, a placement for the new flip-flop(s) is subsequently determined. The new placement is essential to cost the retiming move for possible acceptance, as well as to correctly determine clock allocation for the retimed flip-flops.

At 303 clock allocation is performed. Clock allocation involves identifying a size and location on a target device for clock networks in the system. A clock region is identified for each clock network to define the size and location of the clock network. The clock region may include one or more geometric shapes that may be disjointed, and may include constraints which limit where it is legal to place elements in the clock network. According to an embodiment of the present disclosure, clock allocation is performed utilizing information from initial placement 301 and physical synthesis optimizations 302.

By performing netlist retiming after initial placement and prior to performing clock allocation, permissive clock region sizing and location assignment is allowed. This is beneficial in the presence of large pipeline registers on inputs and outputs.

At 304, incremental placement is performed. Incremental placement refines the initial placement performed at 301 in response to clock allocation performed at 303. According to an embodiment of the present disclosure, incremental placement is performed optionally.

At 305, physical clustering is performed. Physical clustering involves grouping basic logic elements together to form logic clusters or clustered block elements (CBEs). According to an embodiment of the present disclosure, the CBEs are implemented by logic array blocks (LABs) on the target device. According to an embodiment of the present disclosure, physical clustering attempts to maintain an input BLE level placement while generating legal CBEs. The objective of physical clustering is to minimize the number of inter CBE nets. Physical clustering also generates a rough physical placement of the CBEs. Physical clustering may allow CBEs to fit in their respective clock regions.

At 306, placement is performed. The clustered block elements identified at physical clustering 305 are placed on the target device. According to an embodiment of the present disclosure, physical locations on the target device are assigned to the clustered block elements by assigning CBEs to physical LABs on the target device.

At 307, detailed placement is performed. Detailed placement involves further refining earlier generated placement results. According to an embodiment of the present disclosure, detailed placement may change a location of a basic logic element or change a definition of a clustered block element. For example a look up table or register from a first LAB may be moved to a second LAB on the target device in response to optimizing metrics like timing, wiring usage, routing congestion, and/or other criteria.

At 308, physical synthesis optimizations are performed. As with procedure 302, physical synthesis optimizations at 308 may include one or more procedures that improve timing closure by reducing a number of critical paths in the system. According to an embodiment of the present disclosure, physical synthesis optimization 308 involves calling and performing register retiming procedure 105 shown in FIG. 1 on the placed system.

Figure 4A:
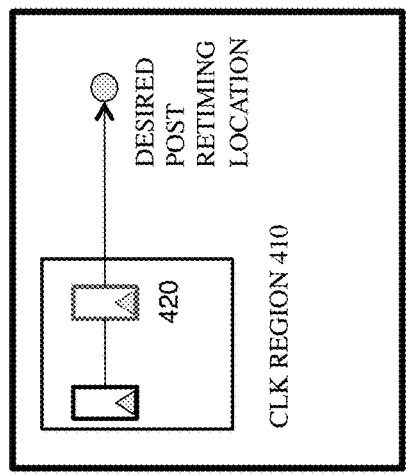
FIGS. 4A-4C illustrate benefits of performing clock allocation after retiming according to an exemplary embodiment of the present disclosure.
Figure 4B:
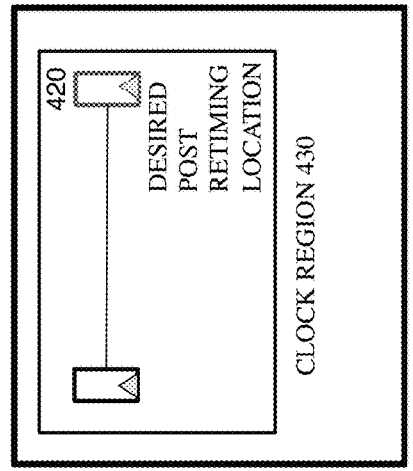
Figure 4C:
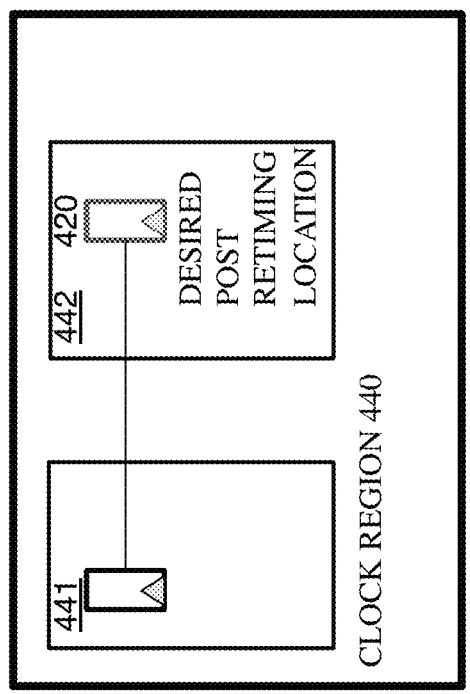

FIGS. 4A-4C illustrate examples of the benefits of performing clock allocation after retiming according to an exemplary embodiment of the present disclosure. FIG. 4A illustrates an example of a system where clock allocation is performed before netlist retiming. As shown, the clock region 410 is constrained such that register 420 cannot be placed at a desired post retiming location. FIG. 4B illustrates an example of a system where clock allocation is performed after netlist retiming. As shown, the clock region 430 is defined to include a location on the target device that includes the desired post retiming location, and register 420 is placed at the desired post retiming location. FIG. 4C illustrates a second example of a system where clock allocation is performed after netlist retiming. As shown, the clock region 440 includes two geometric shapes 441 and 442 and is defined to include a location on the target device that includes the desired post retiming location, and register 420 is placed at the desired post retiming location.

Figure 5:
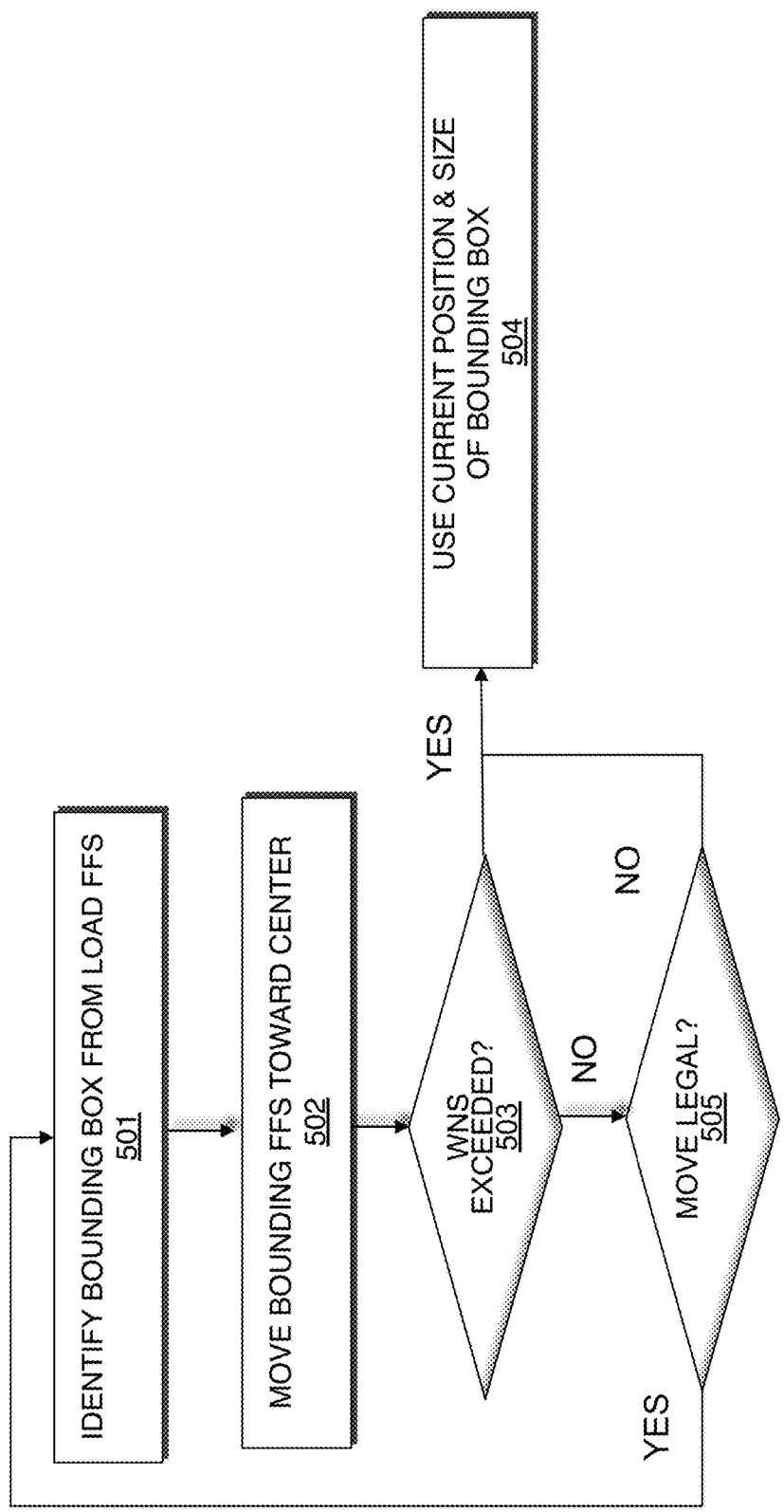
FIG. 5 is a flow chart illustrating a method for performing clock allocation according to an exemplary embodiment of the present disclosure.

FIG. 5 is a flow chart illustrating a method for performing clock allocation according to an exemplary embodiment of the present disclosure. The procedures illustrated in FIG. 5 may be used to implement procedure 303 (shown in FIG. 3). At 501, a bounding box is identified from registers ("load flip-flops") in a clock network. All sequential elements are considered to be part of the clock network. The registers in the clock network may be identified from a description of the clock network generated during synthesis, information generated during an initial placement of the system, and information generated during physical synthesis optimization. The bounding box provides an initial estimate of a size and location of a clock region for the clock network on a target device.

At 502, bounding registers ("bounding flip-flops") are moved toward the center of the bounding box. The bounding registers are registers in the clock network that reside at the out most periphery of the bounding box. It should be appreciated that the bounding registers may also reside inside random access memory (RAM) blocks or digital signal processing (DSP) blocks of the system. In this situation, the RAM blocks or DSP blocks are also moved to the center of bounding box to their legal positions.

At 503, it is determined whether a worst negative slack has been exceeded with the moving of the bounding registers. If it is determined that the worst negative slack has been exceeded, control proceeds to 504. If it is determined that the worst negative slack has not been exceeded, control proceeds to 505.

At 504, the current position and size of the bounding box, prior to the most recent move of bounding registers, is designated as the position and size of the clock region for the clock network.

At 505, it is determined whether moving the bounding registers satisfy legality constraints of the target device. According to an embodiment of the present disclosure, the legality constraints of the target device may require that a local density of registers within a designated area be within a threshold. If moving the bounding registers satisfy legality constraints of the target device, control returns to 501 where a new position and size of the bounding box are identified from the new position of the moved bounding registers. If moving the bounding registers do not satisfy the legality constraints of the target device, control proceeds to 504.

It should be appreciated that the procedures illustrated in FIG. 5 may be performed on each clock network in the system. Furthermore, when a clock network includes a clock region having a plurality of geometric shapes, each geometric shape may have its own corresponding bounding box, and procedures 501-505 may be applied to each bounding box in the clock region.

Figure 6:
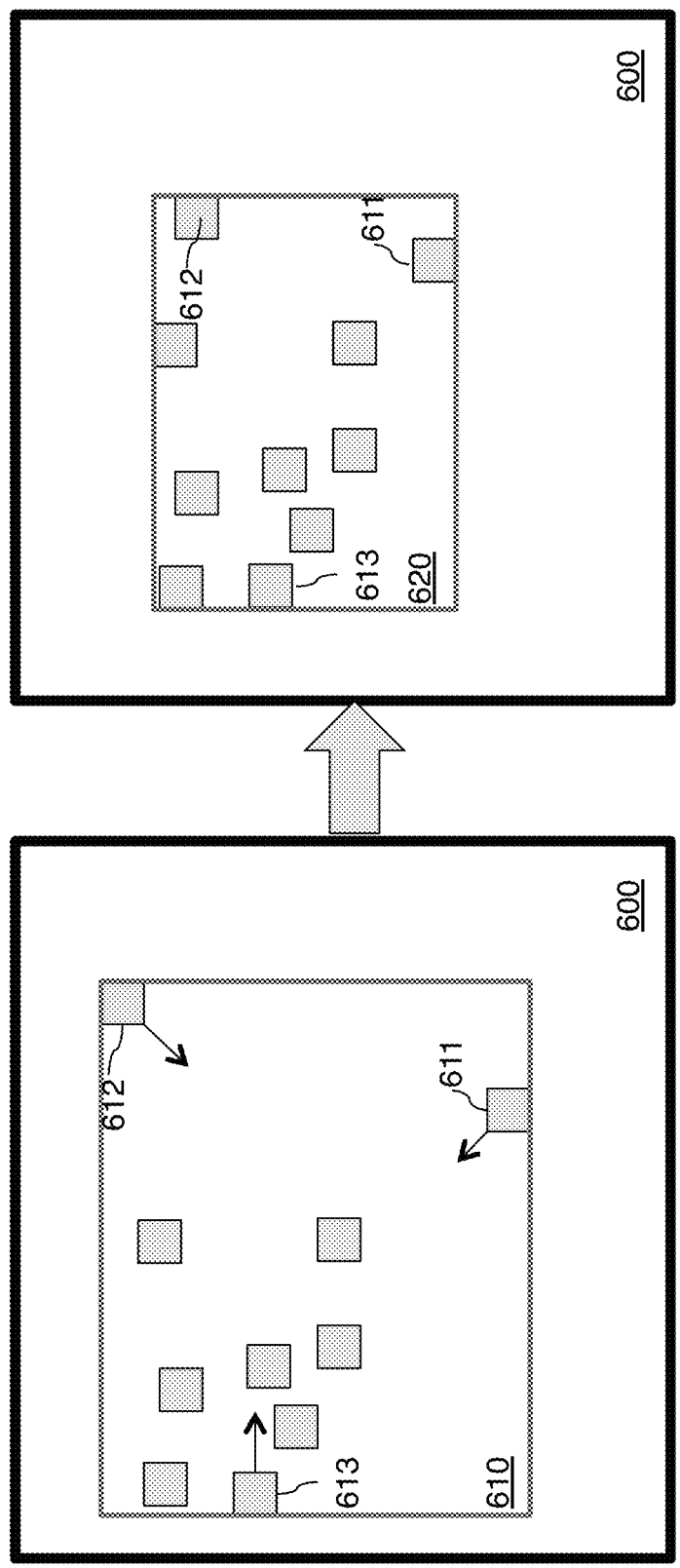
FIG. 6 illustrates an example of clock region definition during clock allocation according to an exemplary embodiment of the present disclosure.

FIG. 6 illustrates an example of clock region definition during clock allocation according to an exemplary embodiment of the present disclosure. On the left side, a bounding box 610 on target device 600 is defined by a plurality of load registers in a clock network including bounding registers 611-613. The bounding registers 611-613 are incrementally moved in the direction of their corresponding arrows towards the center of the bounding box 610. The worst negative slack and legality of placement of the moved registers are observed during the incremental movements. On the right side, a modified bounding box 620 resulting from the movement of bounding registers 611-613 is illustrated. The resulting bounding box 620 may be used to define the clock region of the clock network.

Figure 7:
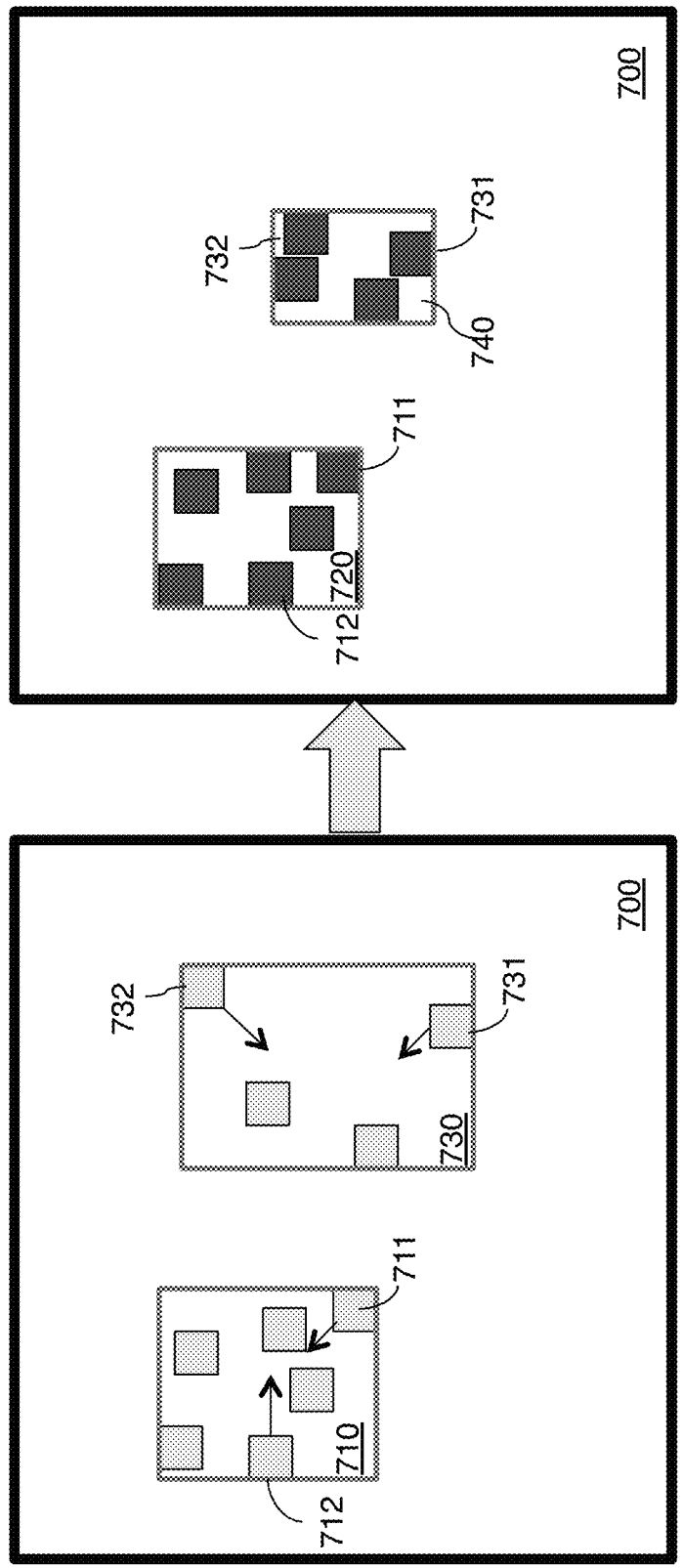
FIG. 7 illustrates an example of defining a clock region having a plurality of geometric shapes during clock allocation according to an exemplary embodiment of the present disclosure.

FIG. 7 illustrates an example of defining a clock region having a plurality of geometric shapes during clock allocation according to an embodiment of the present disclosure. On the left side, a first bounding box 710 on target device 700 is defined by a plurality of load registers in a clock network including bounding registers 711-712. A second bounding box 730 is defined by a plurality of load registers in the clock network including bounding registers 731-732. The bounding registers 711-712 are incrementally moved in the direction of their corresponding arrows towards the center of the first bounding box 710. The bounding registers 731-732 are incrementally moved in the direction of their corresponding arrows towards the center of the second bounding box 730. The worst negative slack and legality of placement of the moved registers are observed during the incremental movements. On the right side, modified bounding boxes 720 and 740 resulting from the movement of bounding registers 711-712, and 731-732 are illustrated. The resulting bounding box 720 and 740 may be used to define the clock region of the clock network.

Figure 8:
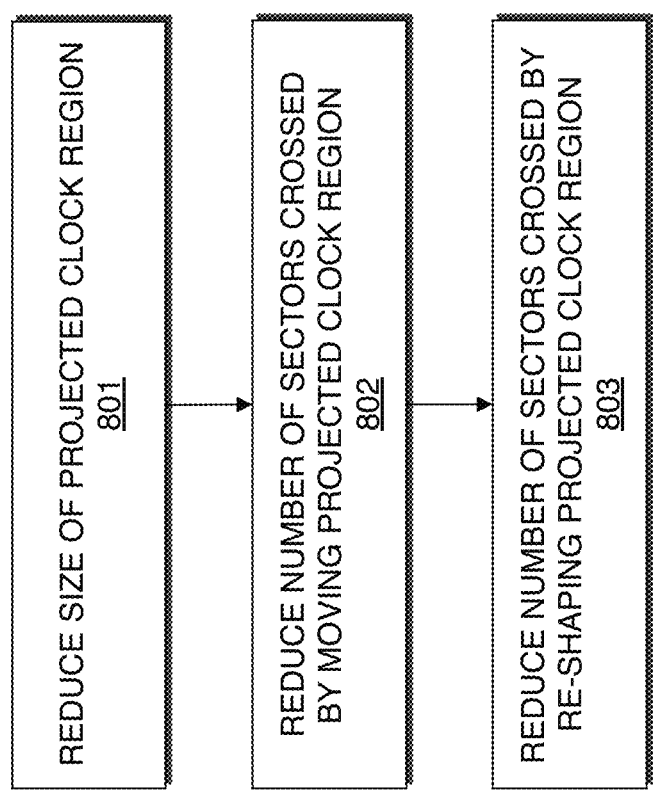
FIG. 8 is a flow chart illustrating a method for performing optimization objectives during an initial placement according to an exemplary embodiment of the present disclosure.

FIG. 8 is a flow chart illustrating a method for performing optimization objectives during an initial placement according to an exemplary embodiment of the present disclosure. In this embodiment, clock regions projected for clock networks in the system are identified from information of the clock network generated during synthesis. During initial placement, additional objectives may be set in order to place components in the clock networks on the target device such that the size and location of the projected clock regions are optimal. At 801, a size of a projected clock region of a clock network is reduced. According to an embodiment of the present disclosure, an objective is added in a global placer used for initial placement to minimize a size of a bounding box for all the registers in a clock domain.

Figure 9:
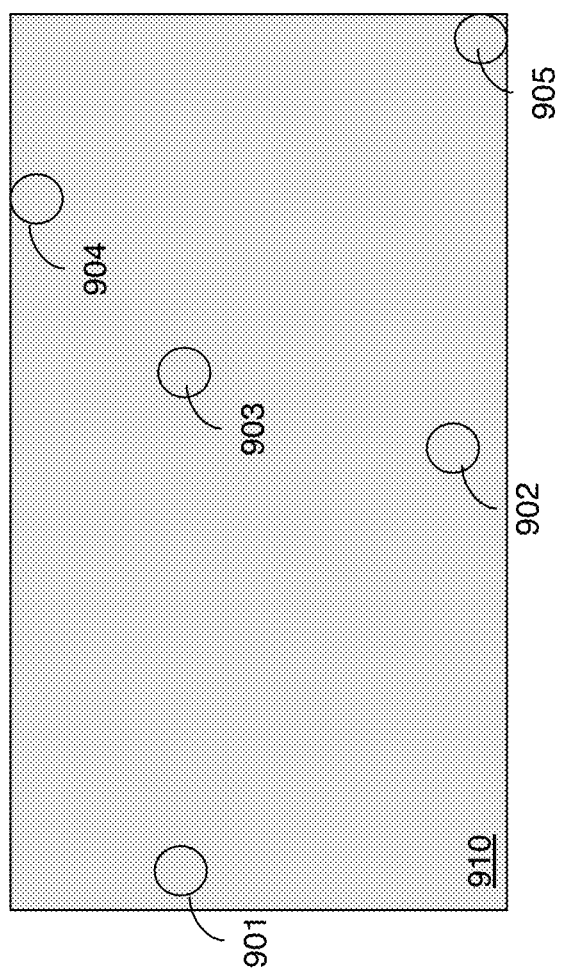
FIG. 9 illustrates an example of reducing a size of a clock region projected for a clock network according to an exemplary embodiment of the present disclosure.

FIG. 9 illustrates an example of reducing a size of a projected clock region for a clock network according to an exemplary embodiment of the present disclosure. The clock network includes a plurality of registers 901-905. A bounding box 910, which is used to define the clock region projected for the clock network, contains the plurality of registers 901-905. The following objective function may be implemented together with other objectives in an initial placement procedure to reduce the size of the bounding box.

$$FF\_BBox\_cost = \max(x_1, x_2, \ldots, x_n) - \min(x_1, x_2, \ldots, x_n) + \max(y_1, y_2, \ldots, y_n) - \min(y_1, y_2, \ldots, y_n)$$

Each x and y term specifies a position of a register on the target device. The term FF_BBox_cost defines a cost for the bounding box where the cost is minimized by the initial placement procedure in conjunction with other objectives like overall wiring usage, routing congestion, legality requirements, and/or other criteria.

Referring back to FIG. 8, at 802, a number of sectors crossed or occupied by a clock region projected for a clock network is reduced by moving the clock region projected to a different location on a target device. According to an embodiment of the present disclosure, the target device may be divided into a plurality of sectors. Each sector may have a given number of resources and may be limited to supporting a threshold number of clock networks. According to an embodiment of the present disclosure, an objective is added in the global placer used for initial placement to reduce a number of sectors spanned by the clock region projected for the clock network by moving the clock region projected for the clock network. The following objective function, FF_sec_align_cost, may be implemented together with other objectives in an initial placement procedure to reduce the number of sectors spanned by a projected clock region.

Find closest_sector_boundary (see_boundary) to clock bbox

If(closest sector_boundary is to LowerLeft of clock bbox)

$$FF\_sec\_align\_cost = ((\min(x_1, x_2, \ldots, x_n) - sec\_boundary \cdot x)^2 + (\min(y_1, y_2, \ldots, y_n) - sec\_boundary \cdot y)^2)$$

else If(closest sector_boundary is to LowerRight of clock bbox)

$$FF\_sec\_align\_cost = ((\max(x_1, x_2, \ldots, x_n) - sec\_boundary \cdot x)^2 + (\min(y_1, y_2, \ldots, y_n) - sec\_boundary \cdot y)^2)$$

else If(closest sector_boundary is to UpperRight of clock bbox)

$$FF\_sec\_align\_cost = ((\max(x_1, x_2, \ldots, x_n) - sec\_boundary \cdot x)^2 + (\max(y_1, y_2, \ldots, y_n) - sec\_boundary \cdot y)^2)$$

else If(closest sector_boundary is to UpperLeft of clock bbox)

$$FF\_sec\_align\_cost = ((\min(x_1, x_2, \ldots, x_n) - sec\_boundary \cdot x)^2 + (\max(y_1, y_2, \ldots, y_n) - sec\_boundary \cdot y)^2)$$

The objective function computes a cost for aligning a clock region projected for a clock network to a closest sector boundary edge. The alignment with the lowest cost is identified, and the clock region projected is moved towards the identified sector boundary edge.

FIG. 10 illustrates an example of reducing a number of sectors crossed by moving a clock region projected for a clock network according to an exemplary embodiment of the present disclosure. The example on the left illustrates a clock region projected for a clock network 1010 occupying 4 sectors on target device 1000. After identifying the closest sector boundary to a corner of the clock region 1010 projected, the clock region projected 1010 is moved upwards and to the right so to occupy only a single sector, as shown in the example on the right. In this example, the lower left of the clock bounding box is the closest point to a sector boundary edge.

Referring back to FIG. 8, at 803, a number of sectors crossed or occupied by a clock region projected for a clock network is reduced by re-shaping the clock region projected. According to an embodiment of the present disclosure, an objective is added in the global placer used for initial placement to reduce a number of sectors spanned by a projected clock region by re-shaping the projected clock region. The projected clock region is defined by a bounding box that includes the registers of the clock network. According to an embodiment of the present disclosure, an aspect ratio of the projected clock region is identified. The aspect ratio of the projected clock region may be identified with the following relationship.

$$AR_{clockFFBox} = [\max(y_1, y_2, \ldots, y_n) - \min(y_1, y_2, \ldots, y_n)] / [\max(x_1, x_2, \ldots, x_n) - \min(x_1, x_2, \ldots, x_n)]$$

An aspect ratio for a desired smaller or minimized projected clock region, $AR_{desired}$, is also identified. The smaller or minimized projected clock region may cross or occupy a fewer number of sectors than the original projected clock region. The following objective function may be implemented together with other objectives in an initial placement procedure to re-shape the size of the bounding box.

$$FF\_AR\_Cost = ([AR_{clockFFBbox}/AR_{desired}] - 1)^2$$

Figure 11:
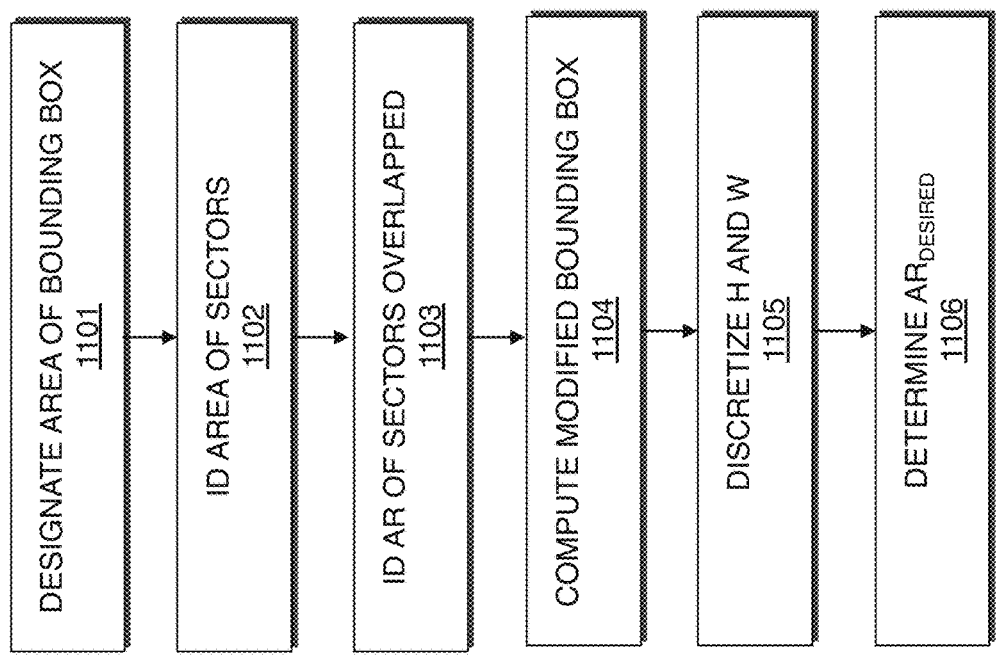
FIG. 11 is a flow chart illustrating a method for identifying an aspect ratio for a desired clock region projected for a clock network according to an exemplary embodiment of the present disclosure.

FIG. 11 is a flow chart illustrating a method for identifying an aspect ratio for a desired projected clock region according to an exemplary embodiment of the present disclosure. At 1101, designate the area of the original projected clock region as the area of the bounding box.

$$A_{clkffbbox} = \text{Area of original Clock } FF \text{ Bbox}$$

At 1102, identify area of sectors required to contain the area of the bounding box, $A_{secffbbox}$. According to an embodiment of the present disclosure, the area of sectors required to contain the area of the bounding box may be identified by using the following relationship.

$$Asecffbbox = ceil(Aclkffbox/Asector) * Asector$$

At 1103, identify an aspect ratio of sectors overlapped by the original projected clock region (bounding box) for the clock network as $AR_{secclkffbbox}$ At 1104, a modified bounding box is computed with the following parameters and relationships.

$$AR = AR_{secclkffbbox}$$

$$\text{Area} = A_{secffbbox}$$

$$H = \text{sqrt}(AR_{secclkffbbox} * A_{secffbbox})$$

$$W = \text{sqrt}(A_{secffbbox}/AR_{sscclkffbbox})$$

At 1105, the height, H, and width, W, are discretized to a sector's height and width to obtain a number of sectors which satisfy the Area, where $H*W >= A_{secffbbox}$. According to an embodiment of the present disclosure, discretization of a real value means snapping to a closest integral number greater than the real value.

At 1106, the aspect ratio for a desired projected clock region is determined by the relationship H/W.

FIG. 12 illustrates an example of reducing a number of sectors crossed by moving a projected clock region according to an exemplary embodiment of the present disclosure. The example on the right illustrates an original projected clock region 1201 occupying 2 sectors on target device

1200. After re-shaping, the modified projected clock region 1202 occupies only a single sector on target device 1200.

FIGS. 1, 3, 5, 8, and 11 are flow charts that illustrate embodiments of the present disclosure. The procedures described in these figures may be performed by an EDA tool implemented by a computer system. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 13:
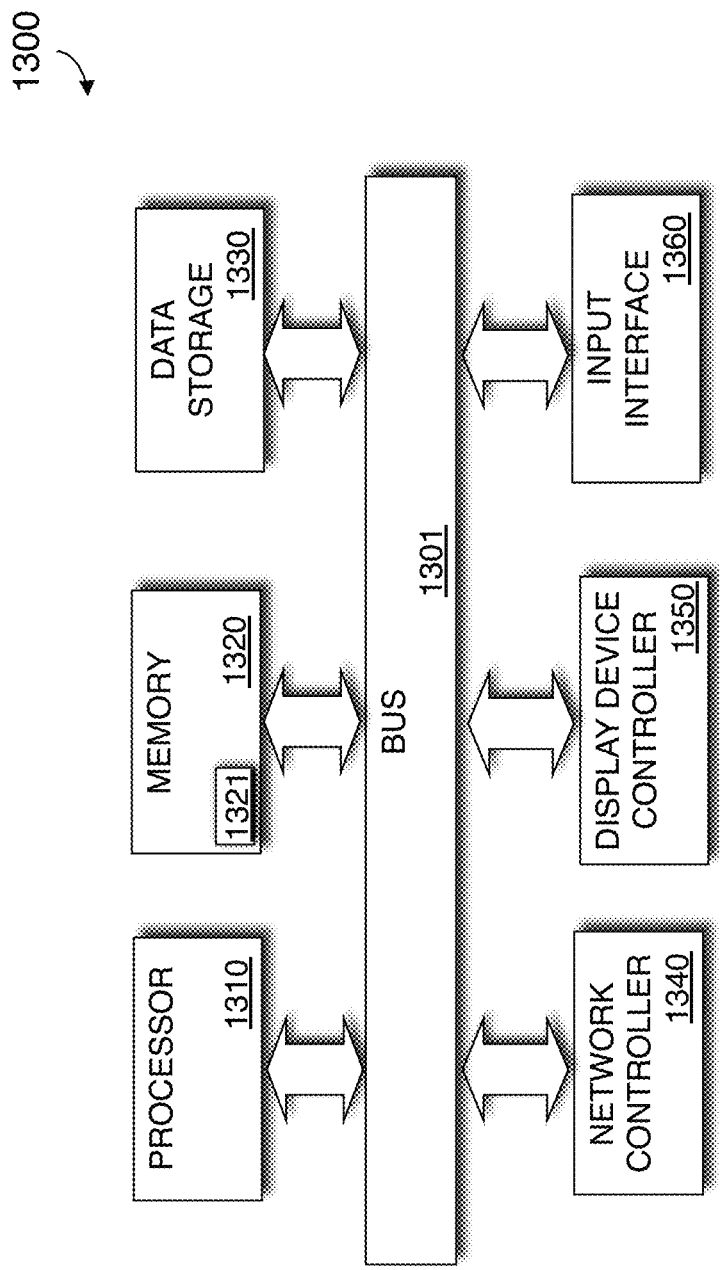
FIG. 13 illustrates a block diagram of a computer system implementing a system designer according to an exemplary embodiment of the present disclosure.

FIG. 13 is a block diagram of an exemplary computer system 1300 in which an example embodiment of the present disclosure resides. The computer system 1300 includes a processor 1310 that process data signals. The processor 1310 is coupled to a bus 1301 or other switch fabric that transmits data signals between processor 1310 and other components in the computer system 1300. The computer system 1300 includes a memory 1320. The memory 1320 may store instructions and code represented by data signals that may be executed by the processor 1310. A data storage device 1330 is also coupled to the bus 1301.

A network controller 1340 is coupled to the bus 1301. The network controller 1340 may link the computer system 1300 to a network of computers (not shown) and supports communication among the machines. A display device controller 1350 is coupled to the bus 1301. The display device controller 1350 allows coupling of a display device (not shown) to the computer system 1300 and acts as an interface between the display device and the computer system 1300. An input interface 1360 is coupled to the bus 1301. The input interface 1360 allows coupling of an input device (not shown) to the computer system 1300 and transmits data signals from the input device to the computer system 1300.

A system designer 1321 may reside in the memory 1320 and be executed by the processor 1310. The system designer 1321 may operate to design a system by performing synthesis, placement, and routing on the system. The system designer 1321 may also perform netlist retiming after an initial placement, and clock allocation utilizing information from the initial placement and the retiming. According to an aspect of the present disclosure, performing clock allocation includes identifying a size and location on the target device for a clock region occupied by a clock network. According to an embodiment of the present disclosure, the initial placement may be performed in response to a clock region projected for the clock network. According to an aspect of the present disclosure, performing placement in response to the clock region projected for the clock network includes reducing a size of the clock region projected for the clock network, and/or reducing a number of sectors occupied by the clock region projected for the clock network by changing a location and/or shape of the clock region projected for the clock network.

Figure 14:
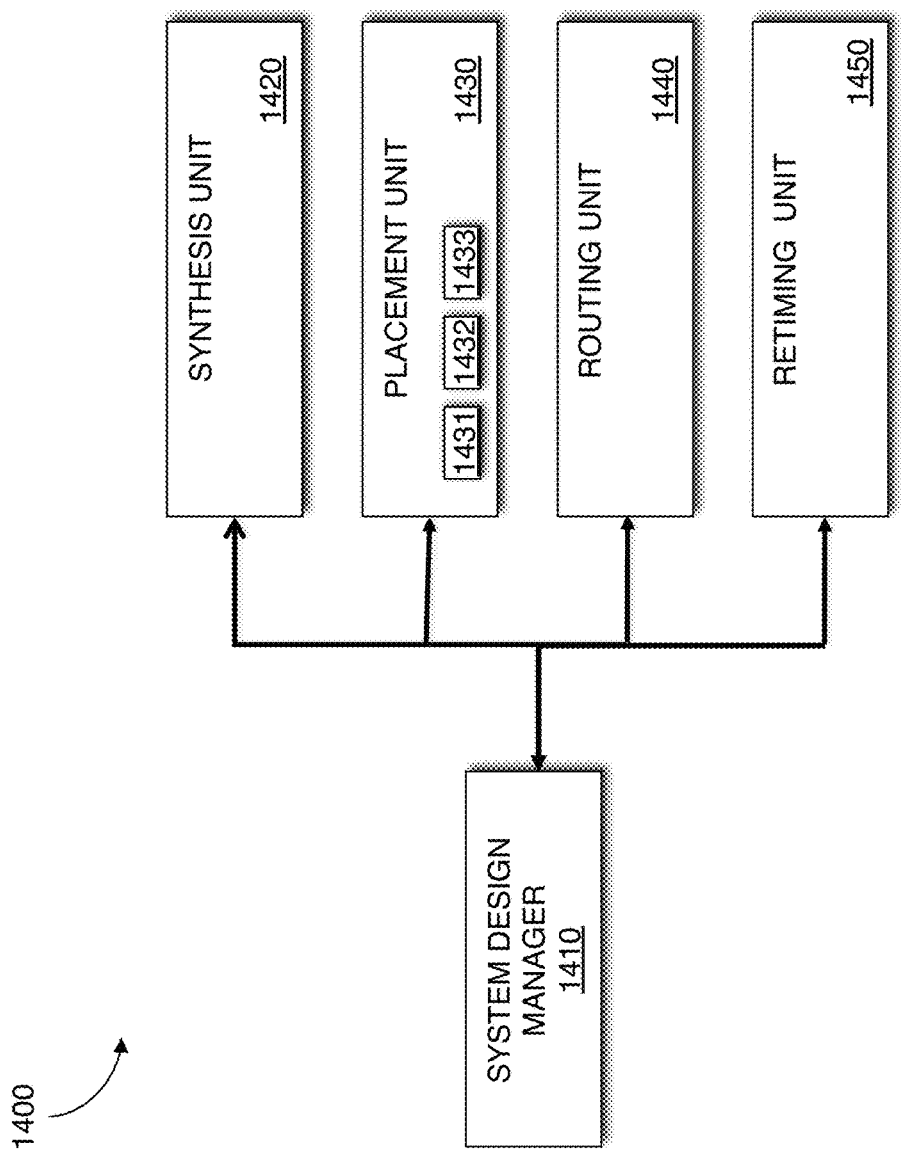
FIG. 14 is a block diagram of a system designer according to an exemplary embodiment of the present disclosure.

FIG. 14 illustrates a system designer 1400 according to an embodiment of the present disclosure. The system designer 1400 may be an EDA tool for designing a system on a target device such as an FPGA, structured application-specific integrated circuit (ASIC), or other circuitry. FIG. 14 illustrates modules implementing an embodiment of the system designer 1400. According to one embodiment, the modules represent software modules and system design may be performed by a computer system such as the one illustrated in FIG. 13 executing sequences of instructions represented by the modules shown in FIG. 14. Execution of the sequences of instructions causes the computer system to support system design as will be described hereafter. In alternate embodiments, hard-wire circuitry may be used in place of or in combination with software instructions to implement embodiments of present disclosure. Thus, embodiments of present disclosure are not limited to any specific combination of hardware circuitry and software.

The system designer 1400 includes a designer manager 1410. The designer manager 1410 is connected to and transmits data between the components of the system designer 1400.

The system designer 1400 includes a synthesis unit 1420 that generates a logic design of a system to be implemented on the target device. According to an embodiment of the system designer 1400, the synthesis unit 1420 takes a conceptual HDL design definition and design constraints, and generates an optimized logical representation of the system. The optimized logical representation of the system generated by the synthesis unit 1420 may include a representation that has a reduced number of functional blocks and registers, such as logic gates and logic elements, required for the system. Alternatively, the optimized logical representation of the system generated by the synthesis unit 1420 may include a representation that has a reduced depth of logic and that generates a lower signal propagation delay.

The synthesis unit 1420 also performs technology mapping. Technology mapping involves determining how to implement the functional blocks and registers in the optimized logic representation utilizing specific resources such as cells on a target device thus creating an optimized "technology-mapped" netlist. The technology-mapped netlist illustrates how the resources (cells) on the target device are utilized to implement the system. In an embodiment where the target device is an FPGA, the technology-mapped netlist may include cells such as logic array blocks (LABs), registers, memory blocks, digital signal processing blocks, input output elements or other components. It should be appreciated that the netlist generated from synthesis identifies one or more clock networks for the system. The identified clock networks may include a plurality of input output pins, phase-locked loops, logic, registers, and other circuitry or components.

The system designer 1400 includes a placement unit 1430 that processes the optimized technology-mapped netlist to produce a placement for each of the functional blocks. The placement identifies which components or areas on the target device are to be used for specific functional blocks and registers. The placement unit 1430 includes an initial placement unit 1431 that performs an initial placement on the system using analytic placement, simulated annealing, and/or another procedure. According to an embodiment of the present disclosure, the initial placement unit 1431 identifies clock regions projected for clock networks in the system from information of the clock network generated by the synthesis unit 1420. During initial placement, components in the clock network may be placed with additional objectives of minimizing a size of the projected clock region, and/or minimizing a number of sectors on the target device crossed or occupied by the projected clock region. According to an embodiment of the present disclosure, initial placement places the system onto basic logic elements. These basic logic elements are assigned to be implemented by specific hardware on a target device.

The placement unit 1430 includes a physical synthesis optimization unit 1432 that performs physical synthesis optimizations on the placed system. Physical synthesis optimizations improve timing closure by optimizing critical paths. According to an embodiment of the present disclosure, physical synthesis optimizations involves performing register retiming using retiming unit 1450.

The placement unit 1430 includes a clock allocation unit 1433 that performs clock allocation on the system. Clock allocation involves identifying a size and location on a target device for clock networks in the system. A clock region is identified for each clock network to define the size and location of the clock network. The clock region may include one or more geometric shapes and may include constraints which limit where it is legal to place elements in the clock network. According to an embodiment of the present disclosure, clock allocation is performed utilizing information from the initial placement and physical synthesis optimizations. It should be appreciated that the placement unit 1430 may include additional units/modules to perform the procedures described with reference to FIGS. 3-12.

The system designer 1400 includes a routing unit 1440 that determines the routing resources on the target device to use to provide interconnection between the components implementing functional blocks and registers of the logic design.

The system designer 1400 includes a register retiming unit 1450 that improves the performance of sequential circuits in the system by repositioning flip-flops (registers) without changing the combinational nodes. The register retiming unit 1450 may perform the optimizations described with reference to FIGS. 2A-2C to improve overall circuit timing.

It should be appreciated that embodiments of the present disclosure may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 15:
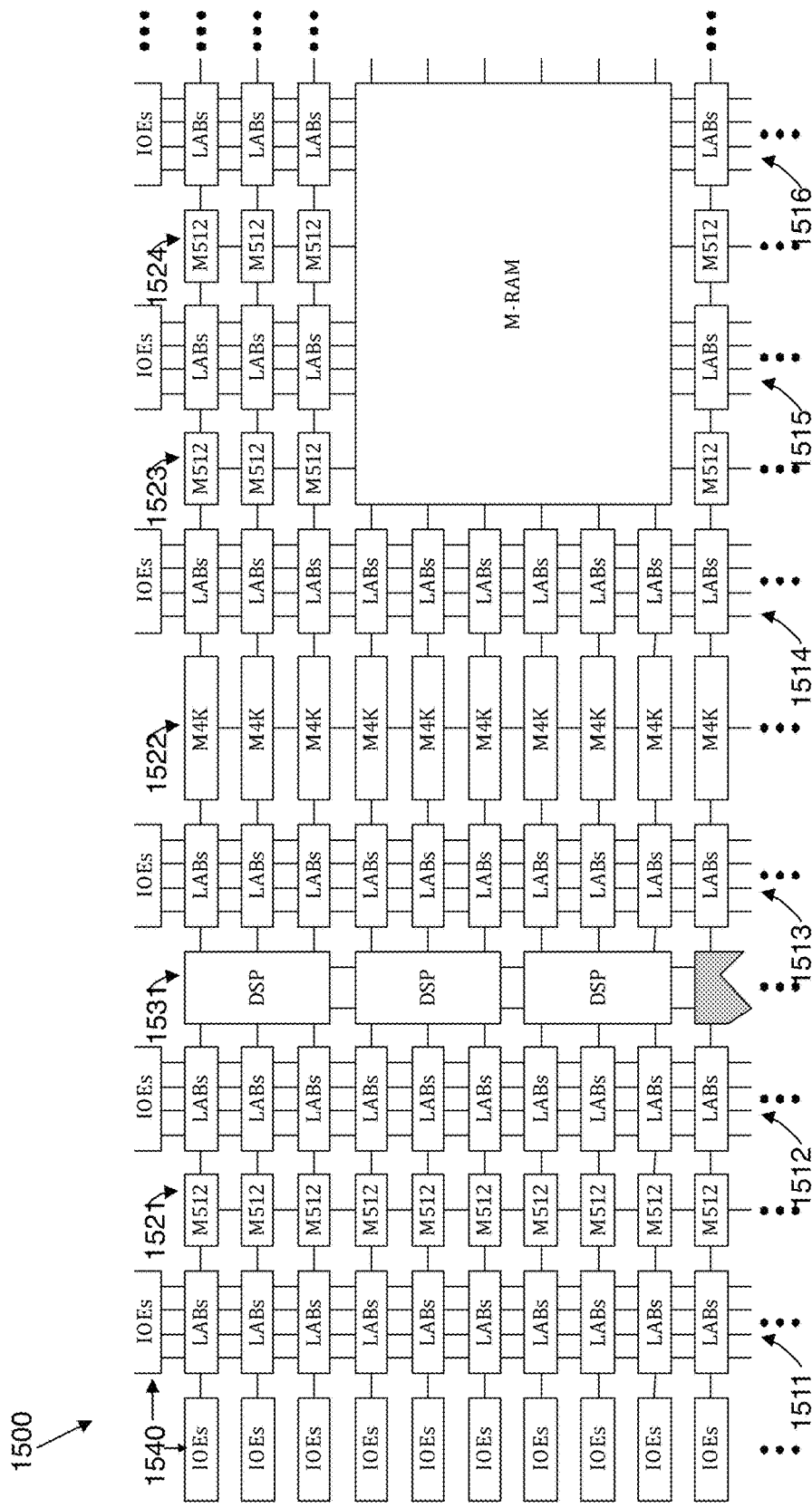
FIG. 15 illustrates an exemplary target device according to an exemplary embodiment of the present disclosure.

FIG. 15 illustrates a device 1500 that may be used to implement a target device according to an embodiment of the present disclosure. The device 1500 is a field programmable gate array (FPGA) that includes a plurality of logic-array blocks (LABs). According to an embodiment of the present disclosure, the device 1500 may be implemented on a single integrated circuit. Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present disclosure, the logic block may operate similarly to a logic element (LE), such as those found in the Stratix or Cyclone devices manufactured by Altera/Intel Corporation, or a combinational logic block (CLB) such as those found in Virtex/Ultrascale devices manufactured by Xilinx Inc. In this embodiment, the logic block may include a four input LUT with a configurable register. According to an alternate embodiment of the present disclosure, the logic block may operate similarly to an adaptive logic module (ALM), such as those found in Stratix devices manufactured by Altera Corporation, now owned by Intel Corporation. LABs are grouped into rows and columns across the device 1500. Columns of LABs are shown as 1511-1516. It should be appreciated that the logic block may include additional or alternate components.

The device 1500 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 1500. Columns of memory blocks are shown as 1521-1524.

The device 1500 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 1500 and are shown as 1531.

The device 1500 includes a plurality of input/output elements (IOEs) 1540. Each IOE feeds an IO pin (not shown) on the device 1500. The IOEs 1540 are located at the end of LAB rows and columns around the periphery of the device 1500. Each IOE may include a bidirectional IO buffer and a plurality of registers for registering input, output, and output-enable signals.

The device 1500 may include routing resources such as LAB local interconnect lines, row interconnect lines ("H-type wires"), and column interconnect lines ("V-type wires") (not shown) to route signals between components on the target device. Although the exemplary device 1500 illustrated in FIG. 15 is a FPGA, the present disclosure may be applied to ASICs, structured ASICs, and to any general digital circuit implementation.

In the foregoing specification, embodiments of the disclosure have been described with reference to specific exemplary embodiments thereof. It will, however, be evident that various modifications and changes may be made thereto without departing from the broader spirit and scope of the embodiments of the disclosure. The specification and drawings are, accordingly, to be regarded in an illustrative rather than restrictive sense.

What is claimed is:

1. A method for designing a system on a target device, the method comprising:
    placing the system on the target device;
    performing a netlist retiming on the placed system; and
    performing a clock allocation that includes identifying a size and a location on the target device for a clock region that is occupied by a clock network by utilizing information from the placing and the netlist retiming.

2. The method of claim 1, wherein the size and the location on the target device for the clock region is not limited to a predefined size and a predetermined area on the target device.

3. The method of claim 1, wherein the identifying the size and the location for the clock region comprises:
generating an initial clock region in response to a placement of all registers in the clock network; and
generating a final clock region by moving bounding registers towards a center of the initial clock region while respecting one or more of worst negative slack, density metrics, wiring usage, wiring congestion, and legality constraints in the clock network.

4. The method of claim 1, wherein the clock region comprises a plurality of disjointed areas.

5. The method of claim 1, wherein the placing the system comprises reducing a size of a clock region projected for the clock network.

6. The method of claim 1, wherein the placing the system comprises reducing a number of sectors on the target device that are crossed by a clock region projected for the clock network.

7. The method of claim 1, wherein the placing the system comprises reducing a number of sectors on the target device that are crossed by a clock region projected for the clock network by re-shaping the clock region projected for the clock network.

8. The method of claim 1 further comprising performing physical clustering and detailed placement refinements after the performing clock allocation.

9. The method of claim 1 further comprising routing the system.

10. The method of claim 1 further comprising incrementally refining the size and the location for the clock region during one or more subsequent stages of compilation.

11. The method of claim 1, wherein clock networks are optimized during a placement taking into consideration one or more of overall wire usage, routing congestion, timing, a total number of clustered block elements created in a clock region, and legality constraints.

12. A non-transitory computer readable medium including a sequence of instructions stored thereon for causing a computer to execute a method for designing a system on a target device, the method comprising:
performing a synthesis where a clock network is defined; and
performing a placement in response to a clock region projected for the clock network.

13. The non-transitory computer readable medium of claim 12, wherein the performing a placement in response to a clock region projected for the clock network comprises reducing a size of the clock region projected for the clock network.

14. The non-transitory computer readable medium of claim 12, wherein the performing a placement in response to a clock region projected for the clock network comprises reducing a number of sectors on the target device that are occupied by the clock region projected for the clock network.

15. The non-transitory computer readable medium of claim 14, wherein the number of sectors that are occupied are reduced by changing a location of the clock region projected for the clock network.

16. The non-transitory computer readable medium of claim 14, wherein the number of sectors that are occupied are reduced by changing a shape of the clock region projected for the clock network.

17. The non-transitory computer readable medium of claim 14, wherein the clock network is optimized during a placement taking into consideration one or more of overall wire usage, routing congestion, timing, and legality constraints.

18. The non-transitory computer readable medium of claim 12, wherein the method further comprises performing a physical retiming to optimize a timing and an area of a design of the system, wherein the physical retiming also determines a placement for new flip-flops added to the design.

19. A system designer, comprising:
a placement unit that places a system on a target device;
a retiming unit that performs a netlist retiming on the placed system; and
a clock allocation unit that performs a clock allocation by identifying a size and a location on the target device for a clock region that is occupied by a clock network by utilizing information from the placing and the netlist retiming.

20. The system designer of claim 19, wherein the placement unit reduces a size of a clock region projected for a clock network.

21. The system designer of claim 19, wherein the placement unit reduces a number of sectors on the target device that are crossed by a clock region projected for a clock network.

22. The system designer of claim 19, wherein the placement unit optimizes clock networks taking into consideration one or more of overall wire usage, routing congestion, timing, and legality constraints.

* * * * *